(12) United States Patent  
Tran

(10) Patent No.: US 7,533,244 B2  
(45) Date of Patent: May 12, 2009

(54) NETWORK-ON-CHIP DATAFLOW ARCHITECTURE

(76) Inventor: Le Nguyen Tran, P411 D1 TT Van Chuong, Dong Da, Hanoi (VN)

( * ) Notice: Subject to any disclaimer, the term of this patent is extended or adjusted under 35 U.S.C. 154(b) by 0 days.

(21) Appl. No.: 11/382,382

(22) Filed: May 9, 2006

(65) Prior Publication Data

US 2007/0266223 A1 Nov. 15, 2007

(51) Int. Cl.
 *G06F 15/82* (2006.01)
(52) U.S. Cl. ........................................ 712/24
(58) Field of Classification Search ............. 712/218, 712/24, 18
 See application file for complete search history.

(56) References Cited

U.S. PATENT DOCUMENTS

| | | | | |
|---|---|---|---|---|
| 5,471,592 A | * | 11/1995 | Gove et al. | 709/213 |
| 5,832,291 A | * | 11/1998 | Rosen et al. | 712/11 |
| 5,848,276 A | * | 12/1998 | King et al. | 710/200 |
| 5,898,881 A | * | 4/1999 | Miura et al. | 712/16 |
| 6,219,833 B1 | * | 4/2001 | Solomon et al. | 717/149 |
| 6,298,433 B1 | * | 10/2001 | Burtsev et al. | 712/201 |
| 6,374,403 B1 | * | 4/2002 | Darte et al. | 717/161 |
| 6,507,947 B1 | * | 1/2003 | Schreiber et al. | 717/160 |
| 7,000,098 B2 | * | 2/2006 | Kunze et al. | 712/248 |

OTHER PUBLICATIONS

Parhi K.K. etal., Static Rate-Optimal Scheduling of Iterative Data-Flow Programs via Optimum Unfolding, 1991, IEEE, pp. 178-195.*
Gajski,D.D. etal, A Second Opinion on Data Machines and Languages, 1982, Computer, pp. 58-69.*
Veen, A.H. , Dataflow Machine Architecture, Dec. 1986 ACM computing surveys, vol. 18, No. 4. pp. 365-396.*
Lee, E.A. etal., Static Scheduling of Synchronous Data Flow Programs of Digital Signal Processing, Jan. 1987, IEEE trans. on computers, vol. C-36, No. 1, pp. 24-35.*

* cited by examiner

*Primary Examiner*—Eric Coleman

(57) ABSTRACT

Network-on-Chip Dataflow Architecture is the new microprocessor architecture. It consists of many processing elements connecting together via two distinct networks namely instruction network and data network. Instructions are fetched into the processing elements through instruction network which uses packet switching scheme. Then the instructions will configure the processing elements and connections of the data network to create a dataflow graph. After that data are transferred and processed by the graph in a dataflow manner. Our architecture has one special characteristic in which instructions within loops are fetched only once but they are used many times.

2 Claims, 3 Drawing Sheets

Data bus

Instruction bus

-Circles: normal processing elements
-An oval: a special processing element
-A rectangle: a program counter
-Lines: connection links
-Dashed lines: special connection Our architecture (the left is data network, the right is instruction network)

Network on Chip Dataflow Architecture

Tran Le Nguyen, Vietnam

We see the following C code (5!).

S=1;
For (i=1; i<5; i++)
    S=S*i;

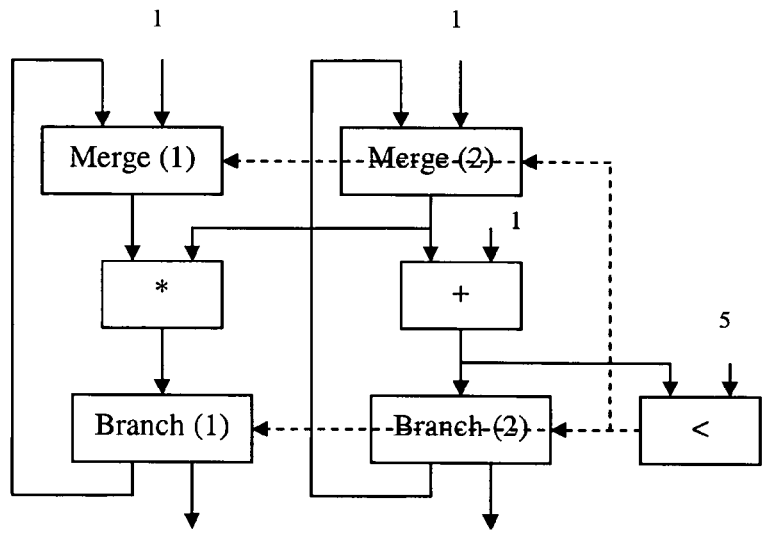

Figure 1. Dataflow graph

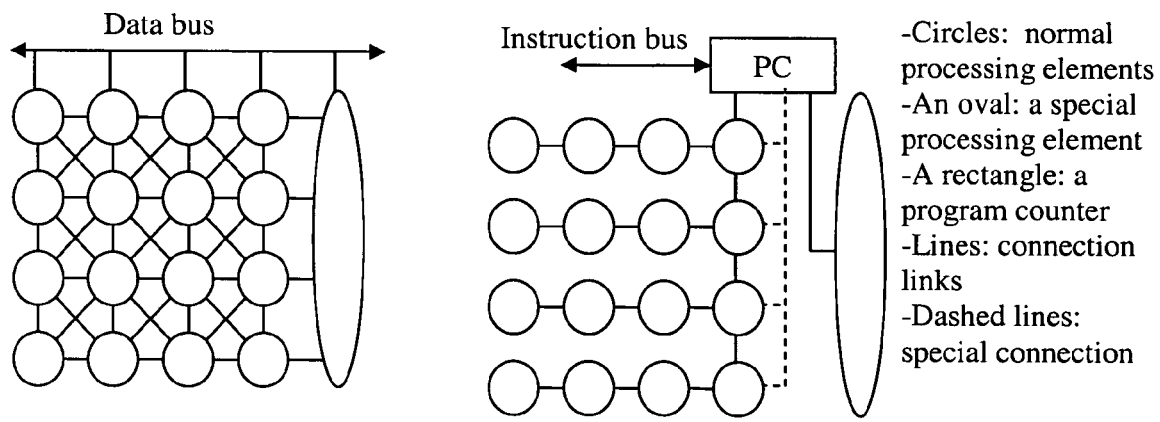

- Circles: normal processing elements
- An oval: a special processing element
- A rectangle: a program counter
- Lines: connection links
- Dashed lines: special connection Figure 2. Our architecture (the left is data network, the right is instruction network)

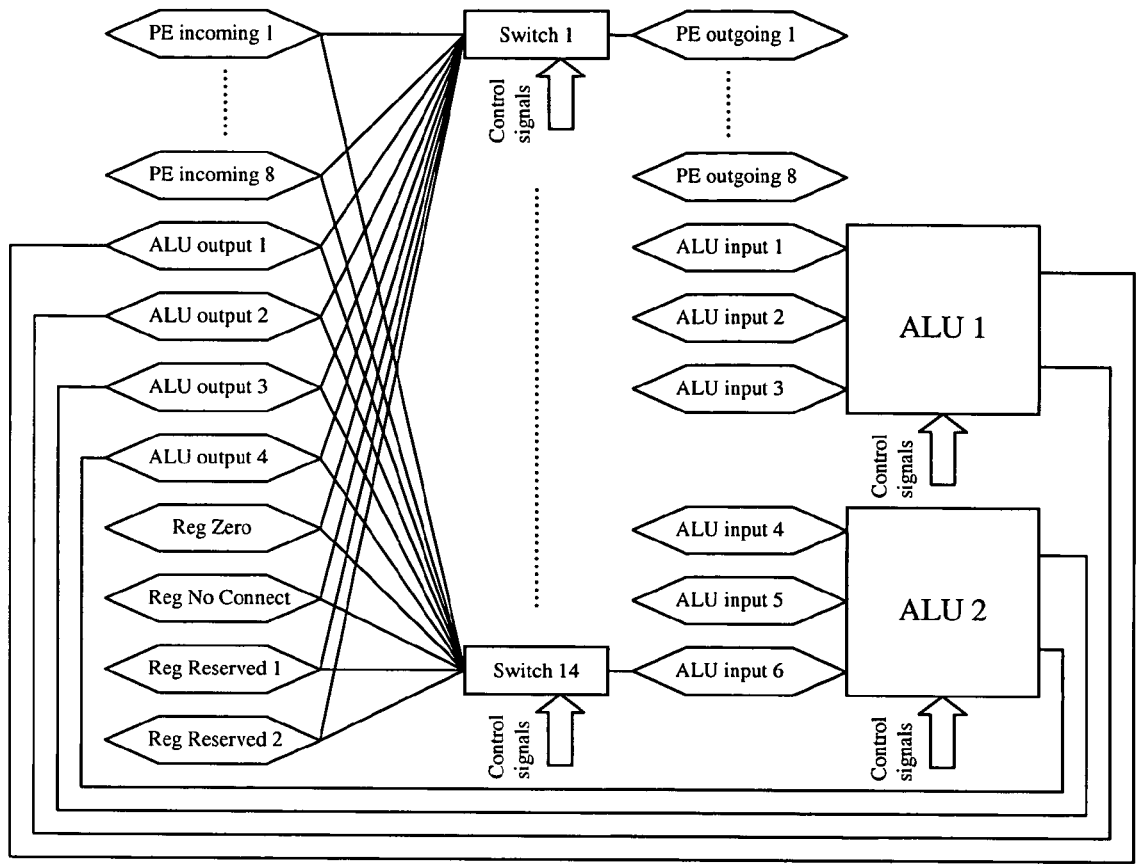
Figure 3. The architecture of a processing element
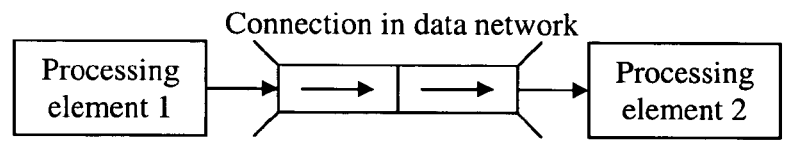
Figure 4. Processing elements connect each other in FIFO model with 2 registers

| Header | Address | Switch 1 | .......... | Switch 14 | ALU 1 | ALU2 |

Figure 5. Structure of uni-cast instructions

| Header | Address 1 | Address 2 | Address 3 | .......... | Address n |

Figure 6. Structure of multicast instructions

| Header | Instruction core |

Figure 7. Structure of broadcast instructions

NETWORK-ON-CHIP DATAFLOW ARCHITECTURE

BACKGROUND OF THE INVENTION

1. Microprocessor challenges

Microprocessors and DSPs are very popular in electronic circuits. However, the way to run instructions sequentially limits the performance of them. Today, people are trying to exploit the instruction level parallelism (ILP). Three most common available architectures namely superscalar, VLIW, chip-multiprocessor can run more than one instructions at the same time. However, all three approaches are not suitable for the future designs. The increase of their performance will come to saturation soon. The reason is that they are not scalable. We explain their problems in the following.

Superscalar processors use dynamic scheduling mechanism. That allows multiple instructions can be issued simultaneously. With this approach, we use some methods like renaming, forwarding, predicting. These cause many limitations. The first one is the window size and maximum issue count. We have to analyze as many instructions as possible to issue those which do not have any dependencies. That needs a lot of effort. For example, determining whether n issuing instructions have any register dependencies requires $n^2-n$ comparisons. That means the size of the analyzing circuit is very large and complex to issue many instructions. The second problem that we have to face is the accuracy of prediction. It is true that no predictor is perfect. The Tournament predictor can be a good one. It requires prediction buffer, and many complicated circuits but its results are not good enough. The third problem is limitation of the number of renaming registers. If we want to increase the superscalar processors' performance by using more hardware resources, our circuit is extremely complicated. We also know that "The smaller is the faster". Hence, the superscalar processors are not as fast as a simple processor.

VLIW can be one alternative to superscalar. This approach uses static scheduling mechanism instead of dynamic one. The compilers implement hazard detection. That simplifies the hardware circuit a lot. However, this approach also has problems. The size of the code can be the most significant one. This problem has two causes. The first one is that in order to increase the ILP, the compilers often unroll the loops. The second one is placing many no-op (no operation) instructions when we do not use some processing elements. It is obvious that we often use only some of the processing elements. For the others, we have to fetch the no-op instruction. Having many processing elements causes this problem more seriously. The more processing elements we have, the more processing elements we do not use, and the more no-ops we need. Large code size makes the cache is not sufficient and causes congestion in the instruction off-chip interface. It is true that although the microelectronic industry develops very fast, the number of pins increases insignificantly. The number of pins increases because we enlarge the size of the chip. It is hardly to reduce the size of pins. Hence, bandwidth is a very important factor. It may be still very difficult to increase the bandwidth in future. Therefore, off-chip interface congestion will limit the performance of VLIW processors.

Another alternative is chip-multiprocessor approach. People integrate many processor cores in one single chip. This idea seems that it is quite scalable and very attractive. With the development of microelectronics, it is totally feasible to integrate many processor cores and a communication network in one chip. However, in fact, this idea is not scalable at all. The reason is bandwidth (similar to the VLIW case). We know that all of these cores have to share the same off-chip bandwidth. The available bandwidth is sufficient for one or two processor cores but it is totally insufficient for hundreds of processor cores. Moreover, chip-multiprocessor is also weak to exploit the ILP of one single thread.

II. NETWORK ON CHIP DATAFLOW ARCHITECTURE

2. Dataflow Model

In this part, we just summarize dataflow model. A clear view of dataflow machine is a good prepare to understand the working of our architecture. In the dataflow execution model, a program is represented by a directed graph. The nodes of the graph are primitive instructions such as arithmetic or comparison operations. The directed edges between nodes represent the data dependencies between instructions. Output data of the previous instruction is the input data of the next one. The data runs along the edges in the queue way (First-In-First-Out). In order to avoid the data hazard, people use tokens to determine the availability of input data. Whenever all input edges of one node have tokens (all input data are available), the node is said to be fireable. A fireable node removes the tokens in the input edges, executes the instruction, places the result with token into output edges, and waits to be fireable again. By this method, instructions are schedule for execution as soon as their operands become available.

With this approach, we do not use normal branch instructions like in the von Neumann architecture. Instead, we have two specific instructions "Branch" and "Merge". Branch node has two input edges and two output edges. One input is used to control. If its data is "true" or "false", branch node moves data from the rest input edge to the first or second output edge respectively. Merge node has three input edges and one output edge. One input is used to control. If its data is "true" or "false", merge node moves data from the second or third input edge to the output edge respectively. In the FIG. 1, we give one example to illustrate the using of these nodes. The detail of data flow model can be found in many other papers.

The operation of the graph in FIG. 1 can be explained in the following. In the beginning, we place constant "false" with tokens to two "Merge" nodes. The first one sends value 1 to the multiplication node (variable S). The second one sends value 1 to both multiplication node and addition node (variable i). Variable S runs in the first loop with operation S=S*i, variable runs in the second loop with the operation i=i+1. When the compare node detects that i is not less than 5, the loop is broken and we get the final values for S and i.

The key advantage of this model is that, in dataflow, more than one instruction can be executed at once. Thus, if several instructions become fireable at the same time, they can execute in parallel. In this approach, detecting data dependencies can be done easily by checking tokens (we do not have to rename, forward . . . ), control dependencies come into data dependencies by using "Branch" and "Merge" (we do not have to predict). Therefore, it may be possible to exploit the whole potential of ILP easily.

SUMMARY OF THE INVENTION

Firstly, we have to state out that out new architecture is only very powerful when instructions within loops are executed. When instructions run sequentially (without loop), the performance of our architecture can be a little higher or ever lower than superscalar or VLIW processors'. However, most of time, computers execute instructions within a loop. That can be proven in the following example. We run one program (a simulation program for example) with the code size which is 1 GB in 1 hour (we do not consider the improvement for small programs running in some seconds). We can fetch 10 MB instructions in one second and assume that there is no stall. Only 10% of instructions are within loops. For this example, the time to run sequential instructions is 1000*0.9/10=90 seconds, and the time to run instructions within loop is 3600−90=3510 seconds. In short, most of time our processor runs instruction within loops. For DSP, it is obvious that we process many signal samples with the same algorithm (FFT, FIR, IIR, DCT, WT . . . ). In other words, we use loops to process data. According to Amdahl's law, the improvement of the big fraction results the considerable improvement of the complete system.

Before explaining the detail of the architecture, we give out some assumptions about future microprocessors and DSPs. If our architecture has all of these properties, it could be a correct approach for the future design.

1. In order to have very high performance, a microprocessor and DSP should have many processing elements (hundreds or thousands). It is far different from the superscalar or VLIW processors now.
2. In order to run many processing elements simultaneously without bandwidth congestion, each processing element needs only a small amount of bandwidth.
3. In order to design a circuit with a huge number of transistors, our design should be very scalable. It can be the replicas of a simple processing element.
4. It is possible and easy to control many (hundreds or thousands) processing elements simultaneously.
5. It is possible and easy to detect the dependency within many (hundreds or thousands) instructions.
6. The power consumption should be low.
7. The clock frequency should be high.

BRIEF DESCRIPTION OF THE DRAWINGS

FIG. 1 shows one example of a dataflow graph showing the structure of a dataflow graph.

FIG. 2 shows the architecture of the Network-on-Chip Dataflow circuit wherein the left of this figure shows a data network, the right of this figure shows an instruction network.

FIG. 3 shows the architecture of the data part of normal processing elements.

FIG. 4 shows the connection in data network.

FIG. 5 shows the structure of a uni-cast instruction.

FIG. 6 shows the structure of a multi-cast instruction.

FIG. 7 shows the structure of a broad-cast instruction.

DETAILED DESCRIPTION OF THE INVENTION

1. Network on Chip Dataflow Architecture

Now, we consider our architecture in detail. There are many processing elements placing in 2-D networks and connecting together. There are two distinct networks namely instruction network and data network to transfer instructions and data respectively (each processing element connects to both networks). Instruction network uses package switching scheme, while data network uses circuit switching scheme. In instruction network, each processing element has a unique address. In addition to two networks, we have a special processing element and a special program counter. In data network, each normal processing element (except the ones on the boundary) connects bi-directionally with eight others around it. A special processing element connects bi-directionally with some normal processing elements on the boundary. There is one data bus connects to normal processing elements on the boundary and the special processing elements. They have to share the bus to access data. In the instruction network, each normal processing element connects uni-directional with the left one, and the under one if it is on the boundary. Instructions are fetched in a network and a special processing element separately. There is one special connection in instruction network. We explain the purpose of that connection later. The structure of our architecture can be shown in the FIG. 2.

Now we explain the operation of this structure. Firstly, we need the dataflow graph. That will be done by compilers. Compilers will create a dataflow graph; implement mapping, placing, and routing to our network. In other words, each processing element in our network corresponds with one node in the dataflow graph, and one connection in our data network corresponds to one edge in the dataflow graph. Therefore, each processing element (node) in our network implements only one instruction, data are processed and transferred in our network like flows, and the availability of data can be determined by tokens associated with them. Because we use this network for instructions within loops, we can load the instructions one time and run many times (for many clock cycles). Secondly, the program counter broadcasts instructions (one instruction per clock cycle) to network (instruction network). Each instruction has one address (It may have more than one address. We explain that later). Broadcasting in instruction network can be done easily. The program counter sends an instruction to the first processing element. It copies the instruction and sends them the second one. All processing elements do the same way. They get instructions from the previous one, copy, and send to next. Each processing element checks the address field in instructions, and obtains the instruction that has its address. Lastly, the instructions create the dataflow graph in our network. Instructions have two part namely operation and routing. Processing elements can do the operation and routing simultaneously. Because we use this network for instructions within loops, we can load the instructions one time but run many times. On average, we can control more processing elements at the same time than the number of instructions we can fetch in one clock cycle.

A special processing element has two functions (the oval in FIG. 2). It is a normal von Neumann processor which needs one instruction to implement one operation. Hence, we fetch instructions to it consecutively (not fetches one instruction and uses it for many clock cycles). The first function of the special processing element is to implement instructions which are not within a loop like a normal processor. The second function is that we can use this special one and the network to implement very large dataflow graphs which are not fit into our network. In this case, we divide the graph into two parts. Our network and the special processing element handle the first and the second part respectively (the first part is small enough to be fit into our network; the second one can have more than one nodes). Because we fetch different instructions into the special one, it can handle the tasks of many nodes. For example, we have 2 nodes in part 2. In the first clock cycle, the special processing element implements the operation of node one, stores results in some registers. In the second clock cycle, it implements the operation of node 2, stores results and repeats the procedure in clock cycle 3, 4, 5 . . . . One processing element handling operations of many nodes can cause bottleneck but in general, our loops are not too large. We may not need the special one in most cases.

In instruction network, we have special connections. The purpose of this connection will be explained later.

2. Processing Element

Now we explain the architecture of one single processing element. As we mentioned before, there are two networks on chip (NoC) in our architecture namely data network and instruction network. Therefore, processing elements have two parts: data part, and instruction part.

2.1. Data Part

As we mentioned before, our processing elements have to implement processing operation (add, subtract), and transfer operation (transfer data from one port to another without processing) at the same time. That can be done in the following.

We assume that we have two ALUs in each processing element, one to process integer number, and one to process floating point number (If we do not need one of them, we can remove). They can also run in parallel. Each ALU has three input ports, and two output ports. In some operations like "Merge", we need three input ports, in some operations like "Multiply", "Divide", "Branch", we need two output ports. In others operations, we let the unused ports opened. That means we have six input, and four output ALU ports in one processing element. Besides, we have eight incoming and eight outgoing PE ports of the processing element connecting to its neighbors. We group 8 incoming PE ports and 4 output ALU ports into group 1, 8 outgoing PE ports and 6 input ALU ports into group 2. We can see that each port of group 2 connects to either exactly one port in group 1 or nothing (opened). In order to be flexible, we extend group 1 with 4 registers. The first one is register "Zero"; that means it has a constant value zero. The second one is register "No Connect"; that means if one port in group 2 connects to it, the port can be consider as opened. The third and the fourth one are "Reserved" registers. They can be defined late according to applications. We can illustrate the data part of a processing element in the FIG. 3.

The "ALUs" in our architecture are similar to normal ALUs. The only difference is that they support "Merge" and "Branch" operations. The switches can be considered simply as multiplexers, which send data from one of their 16 input ports to their output port. We can use 4 bits to control the switch like a multiplexer. The difference between our switches and multiplexers is that out switches always check for available data in the input port and empty place in the output port. That can be done through checking the tokens. If there is a token, data is available. Otherwise, there is an empty place. When there is available input data and empty place in the output port, the switch will transfer data, remove token in the input port, and place a new token in the output port.

In order to increase the performance of our architecture, the data path between two processing elements has 2 registers (instead of one) in FIFO model. If we used only one register, after sending new data, the previous processing element would have to wait for the next processing element to get that data because there is no empty place in the output any more. That reduces the performance of our architecture. If we use two registers, the previous processing element can send new data, and the next processing element can get the old data at the same time. They do not have to wait. Hence, the performance of our architecture is high. That is illustrated in FIG. 4.

2.2. Instruction Part

Our architecture uses some kinds of instructions. To distinguish these kinds of instructions, we use the header field. Firstly, we consider the uni-cast instruction kind. As we have seen in the data part section, we need to fetch control signal to 14 switches and 2 ALUs in each processing element (the number of switches and ALUs can be changed according to applications but the idea is remained). Because each switch has 16 input ports, it requires 4 bits to control. As we have already stated, instructions has address field so that a processing element knows which instructions belong to it, and a header field to distinguish the kinds of instructions. In short, one uni-cast instruction can be presented in the FIG. 5.

We can realize that many processing elements in our network may have the same instruction. Hence, it is more efficient to use multicast mechanism to send one instruction to all of them. In this case, we use multicast instruction. The structure of a multicast instruction is showed in the FIG. 6.

The procedure to use multicast mechanism is following. The Program Counter first broadcast one or some multicast instructions. In the multicast instructions, we place the addresses of the processing elements that we want to give the instruction. After that, we send a uni-cast instruction, and the processing elements, which have addresses equivalent to one of those that have been sent, will get the instruction. If the number of processing elements that we want to send to is smaller than the number of addresses fields, we can fill some address fields with the same value.

In addition, we have broadcast instructions. Broadcast instructions have only the header, and the instruction core. There is no address field. The structure of it is showed in the FIG. 7.

Broadcast instructions are very useful in many cases. Here we give one example. We know that two networks: instruction network and data network are separated. Therefore, we can fetch instructions of the next loop into instruction network while the data network is running. Processing elements get their instructions but do not fetch immediately to their data parts because the data parts do not finish. We use this architecture for loops, so usually the data network needs more time to run. After finishing, it signals the Program Counter, and the Program Counter will broadcast the fetch instruction. When a processing element receives a fetch instruction, it will fetch the instruction that it has received to its data part. If it does not have an instruction, it fetches the no-op instruction. To signal the Program Counter, processing elements use the special connections which is showed in FIG. 2 (the dashed lines).

3. Architecture Analyzing

In this section, we analyze our architecture to prove that it has all properties for future microprocessors and DSPs that we stated previously. It is obvious that with this architecture we can integrate hundreds or thousands processing elements (property 1). However, the bandwidth is not shared for all of them. As we can see in FIG. 2, only the processing elements, which are on the boundary, can access the data bus. The others get data from their neighbors. For instance, if we have 256 processing elements, the data bus is shared for only 16 processing elements. Moreover, when we get data from memory, we implement many operations within our network before restoring new data to memory. That reduces the number of accessing memory. If we compare it with the traditional microprocessors, although they have some registers, they often have to store intermediate value to have empty place to run other instructions. That means we can reduce the traffic in data bus significantly. Obviously, the traffic in the instruction bus is also very low. For one loop, we have to fetch only one time, but we can run many times. For the traditional microprocessors, each operation needs one instruction. In short, with this architecture, we can reduce the traffic between our architecture and memory a lot. That helps us to avoid congestion (property 2). Moreover, our network is homogeneous. We have to design only one processing element and replicate it to the whole network. The design task is very simple. In fact, we can design a heterogeneous architecture based on this idea. For example, we know that the ALU for floating point number is very lager. We can design a network with only some processing elements having the ALU for floating point number. That reduces the size of the network. However, in general, our network is homogeneous. With the development of microelectronic technology, we can integrate more transistors into our chips. In this case, we do not need to redesign anything. What we have to do is increasing the number of processing elements in our network. With others architecture such as superscalar, VLIW we cannot do that. In other words, our architecture fulfills property 3. In addition, it is deterministic and easy to control our architecture (property 4). With packet switching mechanism, we can fetch instructions to any processing element. After that, instructions will do the configuration for all switches. Data is processed by ALUs and transferred by switches in switching mechanism. Because we use this network for instructions within loops, we can load the instructions one time but run many times. On average, we can control more processing elements at the same time than the number of instructions we can fetch in one clock cycle (one instruction per clock cycle). Furthermore, with dataflow model, detecting dependencies among instructions is trivial. That can be done through checking tokens as we mentioned above. We do not have to implement forwarding, renaming, disabling, predicting (property 5). Nowadays, power consumption is an important issue. For portable devices, it is the critical one. However, the more powerful microprocessors are the more power they consume. Our architecture has two outstanding features to save power. The first one is that connections in our architecture are very short. All processing elements connect to only their neighbors. The second one is that the states of processing elements remain for long time. After fetching one instruction, each processing element uses it for many times (because the instructions are within loops). If we do not use some processing elements in our network, we can switch off their power totally. That cannot be implemented in VLIW or superscalar architecture because the state of each processing element changes very often. For example, in this clock cycle we do not use ALU2 but we use it in the next clock cycle. Therefore, we cannot switch off its power. In other words, the power consumption over performance of our architecture is much lower than other architectures' (property 6). Finally, the clock frequency of our architecture is very high because of short connections. With the development of microelectronic technology, the sizes of all components reduce significantly. The transistor switching delay is reduced because the length of transistors reduces. However, the transfer delay increases because the resistance of connection lines increases. All connections in our architecture are short (except data bus). That solves the transfer delay problem. Moreover, with the architecture we propose, it is very easy to apply Global Asynchronous Local Synchronous technique (GALS). Each processing element can have its own clock source. That of course increases the clock frequency.

What is claimed is:

1. A Network-on-Chip Dataflow processor circuit used as a programmable software oriented execution device (generic microprocessor or DSP), characterized in that instructions within loops (for loops and while loops) are fetched into an array of interconnected processing elements to create a dataflow graph to process data in the dataflow model;
   a. wherein said processing elements are connected together through two distinct networks namely instruction network and data network,
   b. wherein each said processing element has a unique address in said instruction network,
   c. wherein each said processing element has at least one ALU to process integer number and/or floating point number, and at least one switch to configure the connections from said processing element's input ports, said ALU's output ports, and some specific registers to said processing element's output ports and said ALU's input ports,
   d. wherein said instruction network uses packet switching scheme that means a program counter sends instructions to said processing elements through either uni-cast mechanism, or multi-cast mechanism, or broad-cast mechanism,
   e. wherein said data network uses circuit switching scheme that means when instructions are fetched, said processing elements configure not only their own ALUs but also their own connections through their own said switches, then data is transferred in data network by configured said connections, and processed by configured said ALUs,
   f. wherein said data network uses tokens to check for the availability of data to transfer or process,
   g. wherein in said data network, only some said processing elements can access data bus, the others get data from their neighbor processing elements.

2. The Network-on-Chip Dataflow processor circuit recited in claim 1, characterized in that instructions within loops are fetched into said array of interconnected processing elements only once but run many times by said processing elements.

* * * * *